United States Patent
Wagner et al.

(10) Patent No.: US 6,469,656 B1
(45) Date of Patent: Oct. 22, 2002

(54) METHOD OF DETECTING MOVING AND/OR STATIONARY OBJECTS IN THE PATH OF A VEHICLE

(75) Inventors: Klaus-Peter Wagner, Stuttgart; Reiner Marchthaler, Gingen; Bernd Ummer, Bad Soden, all of (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 09/708,885

(22) Filed: Nov. 8, 2000

(30) Foreign Application Priority Data

Nov. 9, 1999 (DE) .......................... 199 53 790

(51) Int. Cl.⁷ .............................................. G01S 13/93
(52) U.S. Cl. .............................. 342/70; 342/27; 342/28; 342/104; 342/107; 342/109; 342/113; 342/118; 342/128; 342/133; 342/147; 342/192; 342/193
(58) Field of Search .................... 342/27, 28, 70–72, 342/104–109, 113–116, 118, 128–133, 147, 192–197, 175

(56) References Cited

U.S. PATENT DOCUMENTS 5,619,208 A * 4/1997 Tamatsu et al. .............. 342/70
5,923,280 A * 7/1999 Farmer ........................ 342/70
5,949,366 A * 9/1999 Herrmann .................... 342/72
6,040,796 A * 3/2000 Matsugatani et al. ........ 342/70
6,317,073 B1 * 11/2001 Tamatsu et al. .............. 342/70

FOREIGN PATENT DOCUMENTS

| DE | 42 42 700 A1 | 6/1994 |
| DE | 195 30 065 A1 | 1/1997 |
| DE | 197 22 947 C1 | 2/1999 |

* cited by examiner

Primary Examiner—Bernarr E. Gregory
(74) Attorney, Agent, or Firm—Kenyon & Kenyon

(57) ABSTRACT

A method is described for detecting moving and/or stationary objects in the path of a vehicle, where the distance and velocity of the reflecting object are determined by using a radar sensor, where the frequency of the signal transmitted is modulated in the shape of a ramp according to a multi-ramp method, and some ramps have a lower slope in the frequency curve. The higher spectral components of the mixed signals from the ramps having the lower slope, which are to be assigned to a distance range of the reflecting object which is greater than the distance range belonging to the ramps having the greater slope, are used to determine the distance, speed and angle of objects.

10 Claims, 3 Drawing Sheets

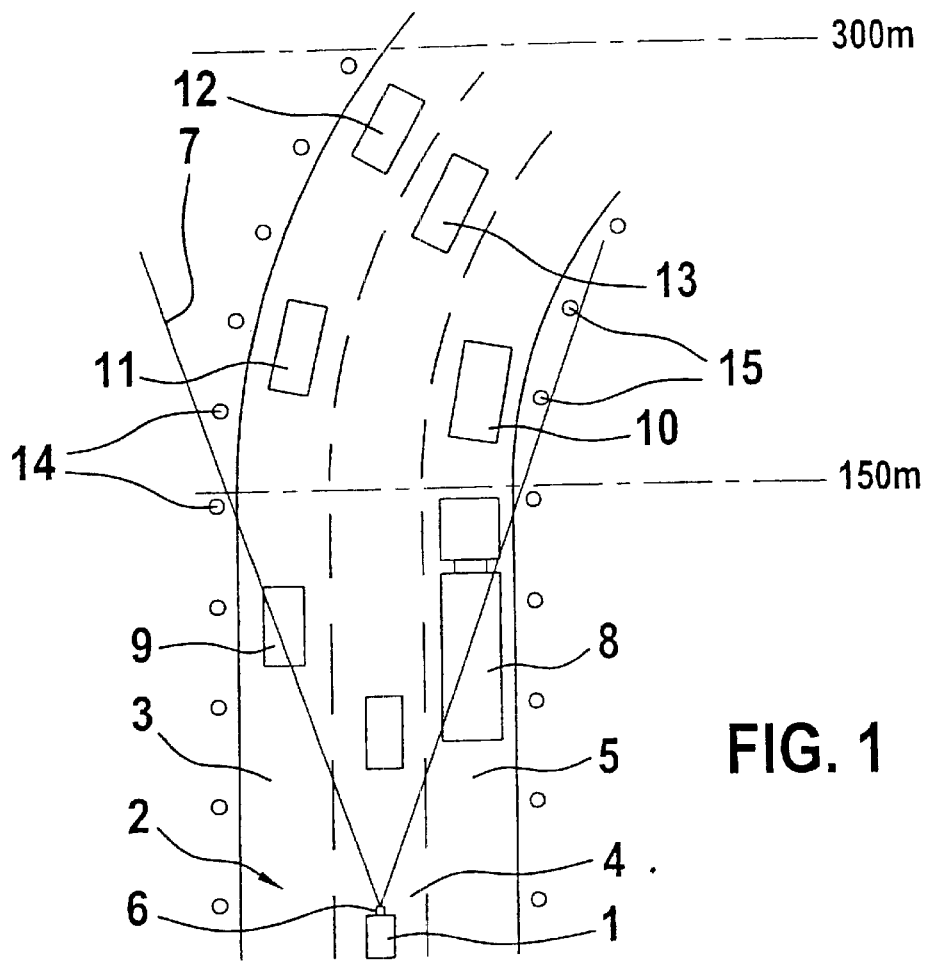
FIG. 1
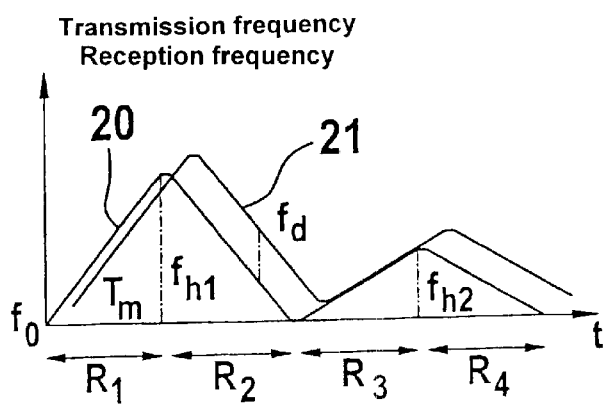
FIG. 2
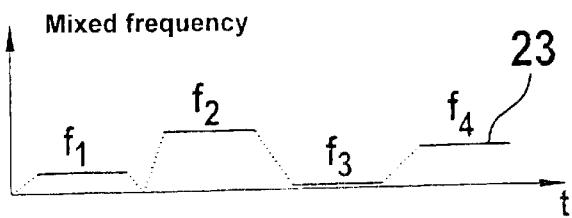

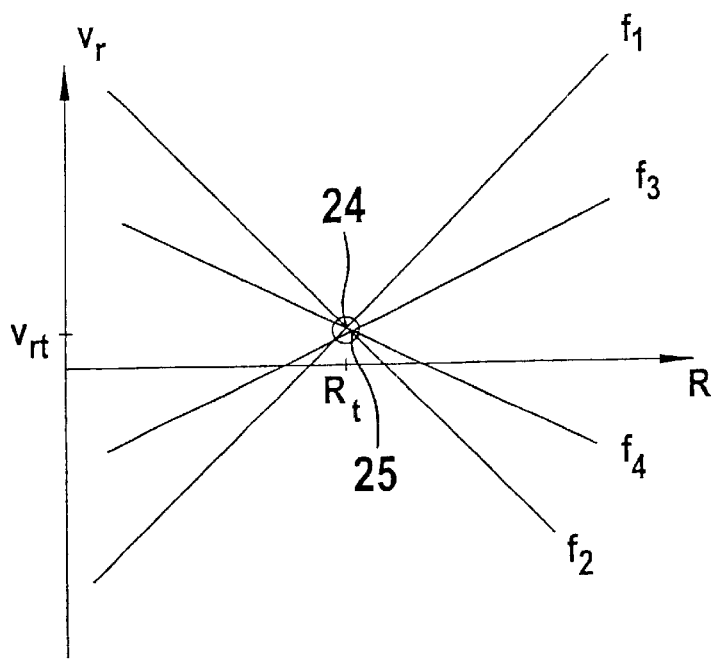
FIG. 3
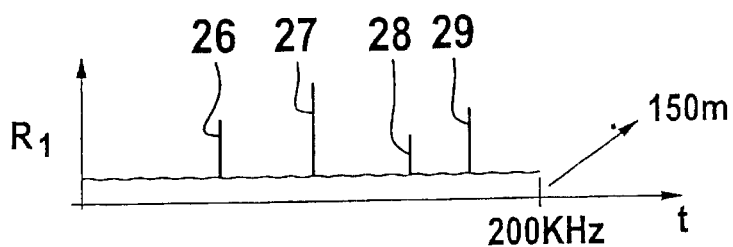
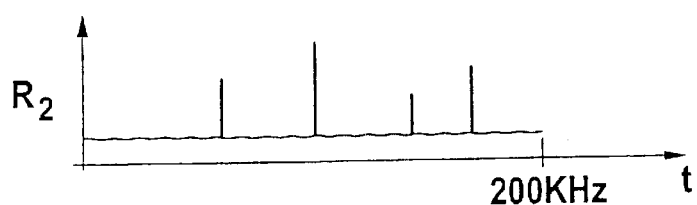
FIG. 4
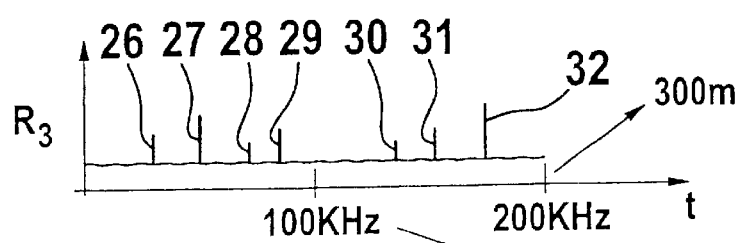
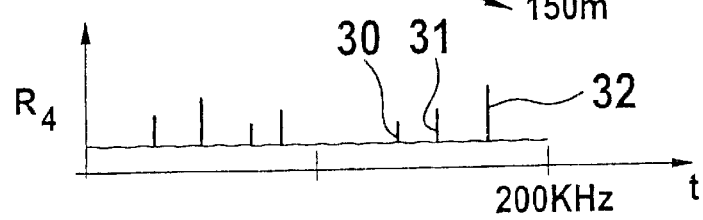

METHOD OF DETECTING MOVING AND/OR STATIONARY OBJECTS IN THE PATH OF A VEHICLE

FIELD OF THE INVENTION

The present invention relates to a method of detecting moving and/or stationary objects in the path of a vehicle, e.g., for predicting the roadway course or for being able to assign vehicles in front to certain lanes.

BACKGROUND INFORMATION

For example, it is known from German Published Patent Application No. 42 42 700, now U.S. Pat. No. 5,483,242, that a radar sensor may be mounted on a vehicle for detecting objects located or moving ahead. This radar sensor maybe, for example, a component of an adaptive cruise control (ACC), where information is constantly being processed regarding the distance and speed of the vehicle relative to other vehicles and to the conditions of the road. For example, an FMCW radar (frequency modulated continuous wave radar) such as that known from German Published Patent Application No. 195 30 065, now U.S. Pat. No. 6,037,894, is mounted on the outside in the front area of the motor vehicle and has both transmission technology with an antenna system to generate radar beams and a receiver with an electronic analyzer. According to German Published Patent Application No. 195 30 065, now U.S. Pat. No. 6,037,894, a lateral position determination of objects can also be performed by a multi-beam method, e.g., in the case of motor vehicles turning a curve.

The arrangements mentioned above make use of the Doppler shift which occurs when a reflecting object moves relative to the object to be measured. In order to determine both the distance and speed of the reflecting object, the frequency of the signal emitted is modulated in the shape of a ramp, with the emitted and received signals being mixed during a rise and a fall in the frequency of the signal emitted. The resulting signals are analyzed spectrally, and the distance and speed of the reflecting objects, which are in a distance range that is predetermined by the respective modulation deviation, are determined from the frequencies of the spectral lines.

To rule out the measurement of illusory objects which is possible here, a multi-ramp method is used in the related art mentioned above, e.g., a four-ramp method, where the rising and falling ramps have a lower slope, i.e., ramps three and four have a different slope in comparison with ramps one and two, preferably amounting to half the frequency deviation. The additional analysis of these reflected signals permits an unambiguous determination of the location of objects in the manner described in German Published Patent Application No. 42 42 700.

The course of the roadway can be detected, i.e., the track or course of the vehicles in front can be predicted from the behavior of objects detected by the radar sensor, namely motor vehicles in the present case. However, with the known methods mentioned above, the only targets that can be used are those which are already in a distance range that is predetermined on the basis of the modulation deviation of ramps one and two (approx. 0–120 m in the case of a modulation deviation of approx. 200 kHz). Such a method is described in German Patent No. 197 22 947, for example.

In addition, it is known that a track or course can be predicted with the help of various sensors in the vehicle itself. For example, the yaw rate, i.e., the angular velocity of the vehicle about its vertical axis, which is determined by a suitable sensor, can be analyzed. However, a curve is detected only when the vehicle itself is in the curve, which is too late to make an appropriate prediction of the path. In particular, it is also necessary to prevent regulation with respect to vehicles traveling in neighboring lanes when entering a curve.

SUMMARY OF THE INVENTION

A method of detecting moving and/or stationary objects in the path of a motor vehicle, where the distance and the speed of the reflecting object are determined in a multi-ramp method using a radar sensor in the manner mentioned above, is improved in an advantageous manner by analyzing the higher spectral components of a signal from the ramps having a lower slope, e.g., ramps three and four, in the manner according to the present invention. Thus, the upper halves of the spectra, which have not been previously analyzed, from modulation ramps three and four, which detect a distance range from 120 to 240 m, for example, are used for the course prediction with an ACC radar sensor as mentioned above. This permits detection of curves in the course of the roadway before the objects at the beginning of the curve become relevant for the ACC control.

The signals from ramps three and four are to be assigned to a distance range of the reflecting object which is greater than the distance range assigned to ramps one and two because of the lower slope of the ramp, and thus they can also be used extremely advantageously for determining the distance, speed and angle of objects at a greater distance. This information is then available to a suitable vehicle control system at a very early point in time, thus permitting an early decision regarding the relevance of radar targets.

In an advantageous embodiment of the present invention, the respective object angle is determined from the signal peaks obtained from the higher spectral components of the signals of ramps three and four, the signal peaks resulting from the radar beams reflected from an object at a greater distance. Thus, the course of the roadway can be deduced from the time characteristic of the respective object angle, and the track or course can be predicted. The respective object angle can be calculated by way of a multi-beam radar known from German Published Patent Application No. 195 30 065.

When using the method according to the present invention, it is also advantageous to be able to perform a certain discrimination of objects according to their distance and relative velocity. By analogy with the four-ramp analysis method, it is therefore proposed that the points of intersection of two lines in a velocity-distance diagram be calculated in a known manner from the frequencies of the signal peaks of ramps three and four. By permutation of all frequencies from ramp three with all frequencies from ramp four, $N^2$ points of intersection are obtained in the case of N detections, of which $N^2-N$ represent illusory targets. To reduce the number of illusory targets, two methods are possible.

First, in correlating the peaks, the respective amplitudes may be used as a criterion. This makes use of the fact that the same target supplies approximately the same levels in two successive ramps following one another at an interval of a few milliseconds. Secondly, the angles for the peaks can be calculated before forming the point of intersection. Peaks belonging to one object have approximately the same angle.

Subsequently, the points of intersection of two lines can be assigned to certain object classes (stationary targets, trucks, passenger vehicles) according to their inherent speeds. Likewise, the variation over time of the centers of gravity of all the lateral distances thus obtained can also be determined by low-pass filtering in an advantageous manner from the radial distance and angle of each object detected, this variation being a measure of the curvature of the roadway for the vehicle.

BRIEF DESCRIPTION OF THE DRAWINGS

FIG. 1 shows a schematic diagram of a roadway course with a vehicle before a curve.

FIG. 2 shows a diagram of the frequency response in the case of a radar sensor with a four-ramp method.

FIG. 3 shows an example of detecting an object with regard to distance and speed by analyzing the points of intersection of the frequencies of all four ramps in a known manner.

FIG. 4 shows the results of the spectral analysis in analyzing the signal peaks of all four ramps.

DETAILED DESCRIPTION

Figure 5:
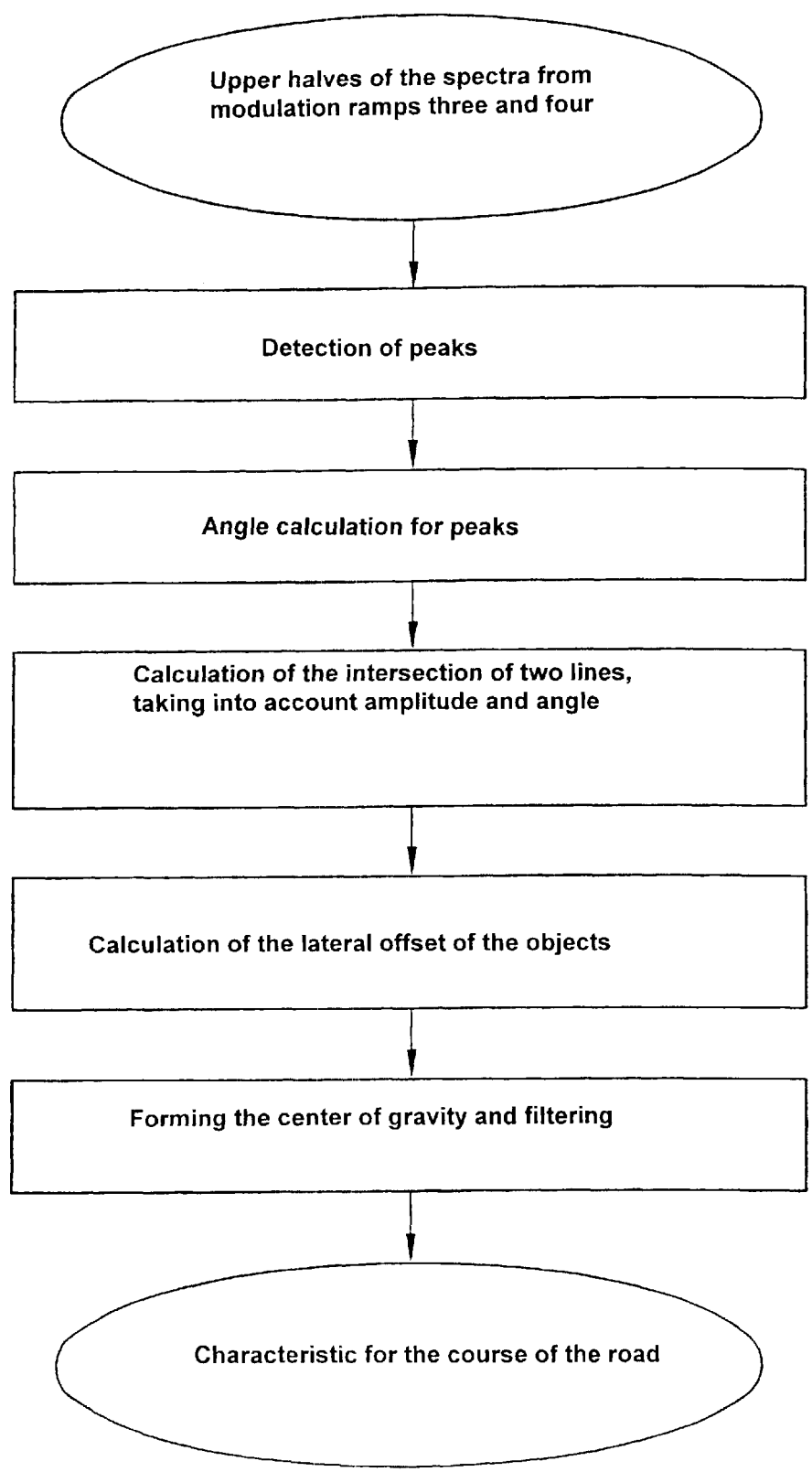
FIG. 5 shows a flow chart for analysis of the measurement results.

FIG. 1 shows a motor vehicle 1, which is on a road 2 having lanes 3, 4 and 5. Vehicle 1 has a radar sensor 6 having a beam cone 7, and it is situated at a distance of approx. 150 m before a curve whose curvature covers a distance of approx. 300 m. Additional vehicles 8 through 13 are also on the road as moving objects of different object classes such as passenger vehicles or trucks or the like and stationary objects 14 and 15 on the side of the road.

In order to guarantee fault-free operation of a control system (ACC) installed in vehicle 1 even when turning a corner, a course prediction is of great importance. The course prediction makes a statement regarding the expected geometry of road 2 to permit a selection of the relevant object for the control. In the case of a multilane road 2, this means that the next vehicle in its own lane (lane 4 here) is selected, and the curvature of road 2 is also taken into account.

FIG. 2 shows diagrams of transmission frequencies 20 and reception frequencies 21 as well as mixed frequencies 23 ($f_1$. . . $f_4$) on the basis of the four-ramp modulation method plotted over time t, as described in the related art according to German Published Patent Application No. 42 42 700, now U.S. Pat. No. 5,483,242. These quantities are linked here by the following mathematical equations:

$$f_1 = a_1 {}^* R - b {}^* v_r;$$

$$f_2 = a_1 {}^* R - b {}^* v_r;$$

$$f_3 = a_2 {}^* R - b {}^* v_r;$$

$$f_4 = a_2 {}^* R - b {}^* v_r \text{ where}$$

$$a_1 = 2 {}^* f_{h1} / c {}^* T_m;$$

$$a_2 = 2 {}^* f_{h2} / c {}^* T_m \text{ and}$$

$$b = 2 {}^* f_0 / c.$$

where:
R=target distance of the object,
$v_r$=relative velocity,
$f_0$=carrier frequency, and
c=velocity of light.

FIG. 3 is a diagram showing the location of points of intersection 24 and 25 in a field having the coordinates of relative velocity $v_r$ and R as the target distance of the object. Point of intersection 24 here is formed from straight lines $f_1$ and $f_2$ and intersection 25 is also formed from the two straight lines $f_3$ and $f_4$. Since the straight lines obtained from the signals of other objects which also have the same slope at the same mixed frequency ($f_1$ to $f_4$), an unambiguous measurement quantity for the object to be determined is obtained only by considering both points of intersection 24 and 25. FIG. 4 also shows diagrams of the object distances $R_1$ to $R_4$ measured from ramps one through four according to FIG. 2 and the resulting signal peaks 26 to 29, each plotted over time t. In the case of the diagrams for $R_1$ and $R_2$, a distance range of approx. 150 m is given for an assumed frequency deviation of approx. 200 kHz. In the case of the diagrams for $R_3$ and $R_4$ a distance range of approx. 150 m is thus also given here on the basis of the lower slope (half the frequency deviation) for an assumed frequency deviation of approx. 100 kHz, and thus a distance range of approx. 300 m is given for the entire frequency deviation of 200 kHz. Signal peaks 26 to 29 mentioned above occur here in the same frequency range and can be used for the four-ramp analysis method. However, there are also other signal peaks 30 to 32 in the frequency range of 100 to 200 kHz which are not analyzed with the method known from the related art.

However, on the basis of the above explanation, only the points of intersection of two lines can be obtained from signal peaks 30 to 32 because they occur only at object distances $R_3$ and $R_4$. It is, however, also advantageous when using the method according to the present invention to be able to perform a certain discrimination of the objects according to distance and relative velocity. By analogy with the four-ramp analysis method, it is therefore proposed that the points of intersection of two lines be calculated in a known way in a velocity-distance diagram by using the frequencies of the signal peaks of ramps three and four.

For a prediction of course using radar sensor 6, the upper halves of the spectra which have not been analyzed so far (see FIG. 4) from modulation ramps three and four are used to detect curves in the course of road 2 according to FIG. 1 at a distance range of more than 150 m, for example, before the objects at the beginning of the curve become relevant for the actual control.

To reduce the number of illusory targets that occur due to analysis of points of intersection of two lines, as mentioned in the introduction of the description, the following process steps are possible, as illustrated in a flow chart according to FIG. 5. First, in assigning peaks 30 to 32 from various modulation intervals, the respective amplitudes may be used as a criterion. The fact that the same target yields approximately the same levels in two successive ramps following one another at an interval of approx. 1 ms is utilized. Secondly, the angles for peaks 30 to 32 can be calculated in a known way before forming the intersection. Peaks 30, 31 or 32 belonging to an object have approximately the same angle. Then the intersections of two lines thus improved can be assigned to certain object classes (stationary targets, trucks, passenger vehicles) according to their characteristic velocity. Also in an advantageous manner, the variation over time of the center of gravity of all lateral distances thus obtained can be determined by low-pass filtering on the basis of the radial distance and the angle of objects 8 to 13 detected (see FIG. 1), in which case this variation is a measure of the curvature of road 2 for this vehicle.

What is claimed is:

1. A method for detecting at least one reflecting object that is one of moving and stationary and is in a path of a vehicle, comprising the steps of:

causing a radar sensor to determine a distance and a speed of the at least one reflecting object;

modulating a frequency of a signal transmitted according to a ramp configuration by a multi-ramp operation;

spectrally analyzing other signals formed by a mixing operation from the transmitted signal and a received signal, wherein:

at least one ramp includes a different slope corresponding to a lower slope in a frequency curve in comparison with other ramps; and determining the distance, the speed, and an angle of the at least one reflecting object on the basis of higher spectral components of a set of the other signals from the at least one ramp, the higher spectral components being assigned to a distance range of the at least one reflecting object that is greater than a distance range assigned to ramps corresponding to a higher slope.

2. The method according to claim 1, further comprising the step of:

performing a four-ramp operation, wherein:

a first ramp and a second ramp correspond to the higher slope, and a third ramp and a fourth ramp correspond to the lower slope.

3. The method according to claim 2, further comprising the steps of:

determining a respective object angle for signal peaks obtained from the higher spectral components from the third ramp and the fourth ramp, the signal peaks resulting from radar beams reflected by the at least one reflecting object; and predicting one of a course and a track on the basis of a variation over time of the respective object angle.

4. The method according to claim 3, further comprising the step of:

causing a multi-beam radar to calculate the respective object angle.

5. The method according to claim 3, further comprising the step of:

analyzing amplitudes of the signal peaks for a determination of at least one of the distance and the speed of the at least one reflecting object detected with the signal peaks from the at least one ramp corresponding to the lower slope by forming points of intersection of frequencies of two of the signal peaks.

6. The method according to claim 5, further comprising the step of:

assigning approximately identical ones of the amplitudes of the signal peaks in a chronological sequence of transmitted modulation ramps to a same one of the at least one reflecting object.

7. The method according to claim 2, further comprising the step of:

calculating object angles for a determination of at least one of the distance of the at least one reflecting object and the speed of the at least one reflecting object detected with signal peaks from the third ramp and the fourth ramp.

8. The method according to claim 7, further comprising the step of:

assigning approximately identical object angles in a chronological sequence of transmitted modulation ramps to a same one of the at least one reflecting object.

9. The method according to claim 1, further comprising the step of:

performing an assignment of the at least one reflecting object to one of a predefined moving object class and a stationary object class on the basis of the determination of the speed of the at least one reflecting object.

10. The method according to claim 1, further comprising the step of:

determining a variation over time of a center of gravity of all obtained lateral distances by performing a low-pass filtering on the basis of a radial distance and an angle of the at least one reflecting object, wherein a curve corresponding to the variation is a measure of a curvature of the path of the vehicle.

* * * * *